United States Patent
Benavides et al.

(10) Patent No.: US 10,214,220 B2
(45) Date of Patent: Feb. 26, 2019

(54) INTELLIGENT DRIVING RECOMMENDATION SYSTEM

(71) Applicant: International Business Machines Corporation, Armonk, NY (US)

(72) Inventors: Marco A. Benavides, Lewisville, TX (US); Diana P. Cabrera, Flower Mound, TX (US); Stephanie De La Fuente, Lewisville, TX (US); Gregory S. Jones, Lewisville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/281,216

(22) Filed: Sep. 30, 2016

(65) Prior Publication Data

US 2018/0093639 A1    Apr. 5, 2018

(51) Int. Cl.
*B60W 40/09*    (2012.01)

(52) U.S. Cl.
CPC ......... *B60W 40/09* (2013.01); *B60W 2540/28* (2013.01)

(58) Field of Classification Search
CPC .............................. B60R 25/102; B60W 40/09
See application file for complete search history.

(56) References Cited

U.S. PATENT DOCUMENTS

| | | | |
|---|---|---|---|
| 8,147,247 B1 | 4/2012 | Reese | |
| 8,841,994 B2 | 9/2014 | Li et al. | |
| 2010/0030586 A1 | 2/2010 | Taylor et al. | |
| 2010/0152976 A1* | 6/2010 | White | A61B 5/117 701/48 |
| 2014/0094987 A1* | 4/2014 | Healey | B60R 25/00 701/1 |
| 2014/0136443 A1 | 5/2014 | Kinsey, II et al. | |
| 2014/0191858 A1 | 7/2014 | Morgan et al. | |
| 2014/0229035 A1 | 8/2014 | Rector et al. | |
| 2014/0309923 A1 | 10/2014 | Ricci | |
| 2016/0039429 A1 | 2/2016 | Abou-Nasr et al. | |
| 2016/0104486 A1* | 4/2016 | Penilla | H04L 67/12 704/232 |
| 2017/0144671 A1* | 5/2017 | Memani | B60W 40/09 |

FOREIGN PATENT DOCUMENTS

| | | |
|---|---|---|
| DE | 112009001231 T5 | 6/2011 |
| DE | 102011111433 A1 | 2/2013 |
| EP | 960995 B1 | 8/2004 |
| WO | 2015074942 A1 | 5/2015 |

OTHER PUBLICATIONS

Payne-Gill, Richard, "ADLV Urges Quarterly Checks to Identify High Risk Drivers and Ensure Road Safety", RealWire, Issue Date Sep. 22, 2015, 2 pages.

* cited by examiner

*Primary Examiner* — Curtis Odom
(74) *Attorney, Agent, or Firm* — Daniel R. Simek (57) ABSTRACT

An indication from an identification device is received. The indication includes identification information for each user of one or more users in a vehicle. The identification device is found in the vehicle. Whether the identification information for each user of the one or more users is correct is determined. Responsive to determining the identification information for any user of the one or more users is incorrect, a manager of the vehicle is notified.

20 Claims, 3 Drawing Sheets

FIG. 3

INTELLIGENT DRIVING RECOMMENDATION SYSTEM

BACKGROUND

The present invention relates generally to the field of vehicles, and more particularly to intelligent driving systems.

A vehicle is a mobile machine that transports people or cargo. Typical vehicles include wagons, bicycles, motor vehicles, railed vehicles, watercraft, aircraft and spacecraft. Land vehicles can be classified broadly by wheeled vehicles that apply steering and drive forces to the ground. The most common vehicle is a car that includes four wheels, an engine for acceleration, braking systems for deceleration and a steering mechanism.

SUMMARY OF THE INVENTION

Embodiments of the present invention include a method, computer program product, and system for controlling driver usage. In one embodiment, an indication from an identification device is received. The indication includes identification information for each user of one or more users in a vehicle. The identification device is found in the vehicle. Whether the identification information for each user of the one or more users is correct is determined. Responsive to determining the identification information for any user of the one or more users is incorrect, a manager of the vehicle is notified.

DETAILED DESCRIPTION

Embodiments of the present invention provide for receiving identification information about any number of users entering a vehicle. Embodiments of the present invention provide for verifying the identification of the any number of users and providing an alert if any of the any number of users are not identified. Embodiments of the present invention provide for receiving permissions data related to the vehicle for the any number of users that are verified. Embodiments of the present invention provide for verifying the driving permissions. Embodiments of the present invention provide for receiving saved data that was previously determined for the any number of users. Embodiments of the present invention provide for receiving live data for the vehicle and the any number of users. Embodiments of the present invention provide for determining a driver score based on the saved data and the received live data. Embodiments of the present invention provide for making recommendations based the saved data, the live data, and/or the driver score.

Embodiments of the present invention recognize that road safety management systems have experienced increasing challenges with recent growths in population and vehicle traffic and that road networks have been outstripped of their current capacity which has resulted in decreases in the quality of life and road safety.

The present invention will now be described in detail with reference to the Figures.

Figure 1:
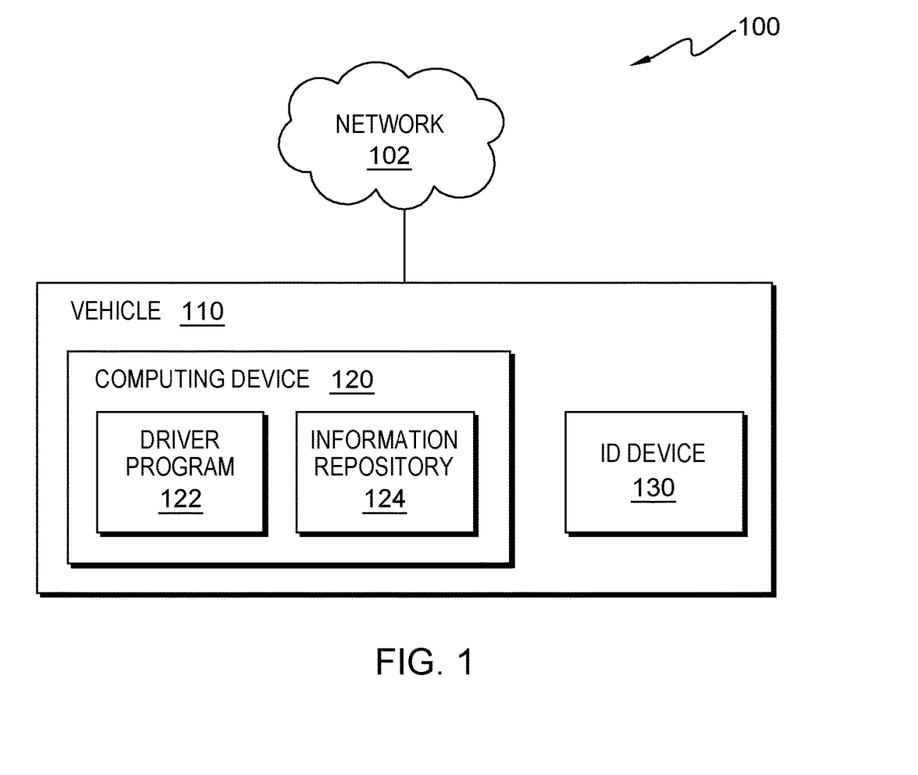
FIG. 1 depicts a functional block diagram of a data processing environment, in accordance with an embodiment of the present invention.

FIG. 1 is a functional block diagram illustrating a data processing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

An embodiment of data processing environment 100 includes vehicle 110, interconnected over network 102. Network 102 can be, for example, a local area network (LAN), a telecommunications network, a wide area network (WAN) such as the Internet, or any combination of the three, and include wired, wireless, or fiber optic connections. In general, network 102 can be any combination of connections and protocols that will support communications between vehicle 110 and any other computer connected to network 102, in accordance with embodiments of the present invention. In an embodiment, data collected and/or analyzed by vehicle 110 may be received by another computing device (not shown) and communicated to vehicle 110 via network 102. In an embodiment, data collected and/or analyzed by another computing device (not shown) may be communicated to vehicle 110 via network 102.

In an embodiment, vehicle 110 may be a wheeled, self-powered motor vehicle used for transportation. In an embodiment, vehicle 110 may include two, three, four, or any number of wheels. In an embodiment, vehicle 110 may be driven by a user. In an alternative embodiment, vehicle 110 may be a driven by a semi-automated or fully automated system. For example, vehicle 110 may be a car, truck, motorcycle, 18-wheeler, etc.

In an embodiment, vehicle 110 includes computing device 120 and ID device 130. In an embodiment computing device 120 may be integrated with vehicle 110 to perform/manage capabilities of vehicle 110. In an alternative embodiment, computing device 120 may be external to vehicle 110 and perform, solely, the functionality of driver program 122 and information repository 124, discussed herein. In an embodiment, ID device 130 may perform identification services of a user (i.e., driver, passenger, etc.) of vehicle 110.

In an embodiment, computing device 120 may be a laptop, tablet, or netbook personal computer (PC), a desktop computer, a personal digital assistant (PDA), a smart phone, camera, video camera, video device or any programmable electronic device capable of communicating with any computing device within data processing environment 100. In certain embodiments, computing device 120 collectively represents a computer system utilizing clustered computers and components (e.g., database server computers, application server computers, etc.) that act as a single pool of seamless resources when accessed by elements of data processing environment 100, such as in a cloud computing environment. In general, computing device 120 is representative of any electronic device or combination of electronic devices capable of executing computer readable program instructions. In an embodiment, computing device 120 may include components as depicted and described in detail with respect to FIG. 3, in accordance with embodiments of the present invention.

In an embodiment, computing device 120 includes driver program 122 and information repository 124. In an embodiment, driver program 122 is a program, application, or subprogram of a larger program for driver vehicle usage. In an alternative embodiment, driver program 122 may be located on any other device accessible by computing device 120 via network 102. In an embodiment, information repository 124 may include information about any number of users (i.e., drivers, passengers, owners, etc.) of the vehicle. In an alternative embodiment, information repository 124 may be located on any other device accessible by computing device 120 via network 102.

In an embodiment, driver program 122 may receive identification information for any number of users of the vehicle. In an embodiment, driver program 122 may determine a physical area (i.e. physical environment). In an embodiment, driver program 122 verify the identification of the any number of users. In an embodiment, driver program 122 may send an alert if the identification of the any number of users is not verified. In an embodiment, driver program 122 may receive permission data for the any number of verified users. In an embodiment, driver program determines if the any number of verified users have permission to use the vehicle. In an embodiment, driver program 122 may send an alert if any number of the users do not have permission to use the vehicle. In an embodiment, driver program 122 may receive saved data for any number of verified users that have permission to use the vehicle. In an embodiment, driver program 122 receives live data regarding the any number of users that have permission to use the vehicle and the environment the vehicle is traveling through. In an embodiment, driver program 122 determines a driver score for any number of verified users that have permission to the use the vehicle. In an embodiment, driver program 122 provides recommendations about the any number of verified users that have permission to use the vehicle.

In an embodiment, driver program 122 may include a user interface that allows a user to interact with driver program 122. A user interface (not shown) is a program that provides an interface between a user and driver program 122. A user interface refers to the information (such as graphic, text, and sound) a program presents to a user and the control sequences the user employs to control the program. There are many types of user interfaces. In one embodiment, the user interface can be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In an embodiment, computing device 120 includes information repository 124. In an embodiment, information repository 124 may be managed by driver program 122. In an alternative embodiment, information repository 124 may be managed by the operating system of computing device 120, alone, or together with, driver program 122. In an embodiment, information repository 124 may include information about any number of users of the vehicle. In an embodiment, the information may include login verification information about any number of users (i.e., a password, fingerprint, retinal scan, key fob data, driver license number, etc.) In an embodiment, the information may include permissions information for the any number of user (i.e., what users can drive the vehicle, where the users can drive the vehicle, when the users can drive the vehicle, etc.). In an embodiment, the information may include regulatory permissions information for the any number user (i.e., information regarding the ability of a user to have permission to drive a vehicle, information regarding license privileges of a user, etc.) from a government agency such as a department of motor vehicles (DMV) or a Department of Public Safety (DPS). In an embodiment, the information may include one or more driver scores previously determine for the any number of users. In an embodiment, the information may include driving habits of the any number of users. In an embodiment, the information may include real time data regarding updated driver scores, driving habits for the any number of users. In an embodiment, the information may include demographic data about the any number of users. In an embodiment, the information may include biometric data about any number of users. In an embodiment, the information may include data about the vehicle (i.e., GPS location, vehicle speed, tire pressure, fuel levels, etc.) In an embodiment, the information may include segment trends (i.e., biometric readings show increased heart rate in high traffic areas, employment can be inferred from repeated driving patterns, average speed can be analyzed for road types along with analysis of driver score) for the any number of drivers. In an embodiment, the information may include the name of the user, age of the user, gender of the user, marital status of the user, senior citizen flag for the user, disabled citizen flag for the user, corrective visions requirement flag for the user, children of the user (i.e., name, number, age range, etc.), comfort preferences (i.e., climate control preferences, radio settings preferences, mirrors setting preferences, seat adjustment preferences), favorite locations (i.e., restaurants, shopping, gas stations, rest areas, cities, etc.), driving class permission (i.e., commercial vehicles, watercraft, taxis, motorcycle), excluded vehicles the driver is not allowed to drive, driving habits (i.e., average speed, average acceleration, miles driven, etc.). In an embodiment, information may include a minimum driving score that is required to operate a specific vehicle.

Information repository 124 may be implemented using any volatile or non-volatile storage media for storing information, as known in the art. For example, information repository 124 may be implemented with a tape library, optical library, one or more independent hard disk drives, multiple hard disk drives in a redundant array of independent disks (RAID), solid-state drives (SSD), or random-access memory (RAM). Similarly, information repository 124 may be implemented with any suitable storage architecture known in the art, such as a relational database, an object-oriented database, or one or more tables.

In an embodiment, ID device 130 may be one or more device(s) that verification of the identity of the one or more users of the vehicle. In an embodiment, ID device 130 may be a scanner to read information on a driver license of a user. In an embodiment, ID device 130 may be a biometric scanner (i.e., fingerprint scanner, eye scanner, voiceprint reader, etc.). In an embodiment, ID device 130 may be a key fob reader. In an embodiment, ID device 130 may be any combination of a scanner, biometric scanner, key fob reader, etc., discussed previously. In an embodiment, ID device 130 may be a scanner that interacts with a mobile device for verification of the identity of the one or more users of the vehicle.

Figure 2:
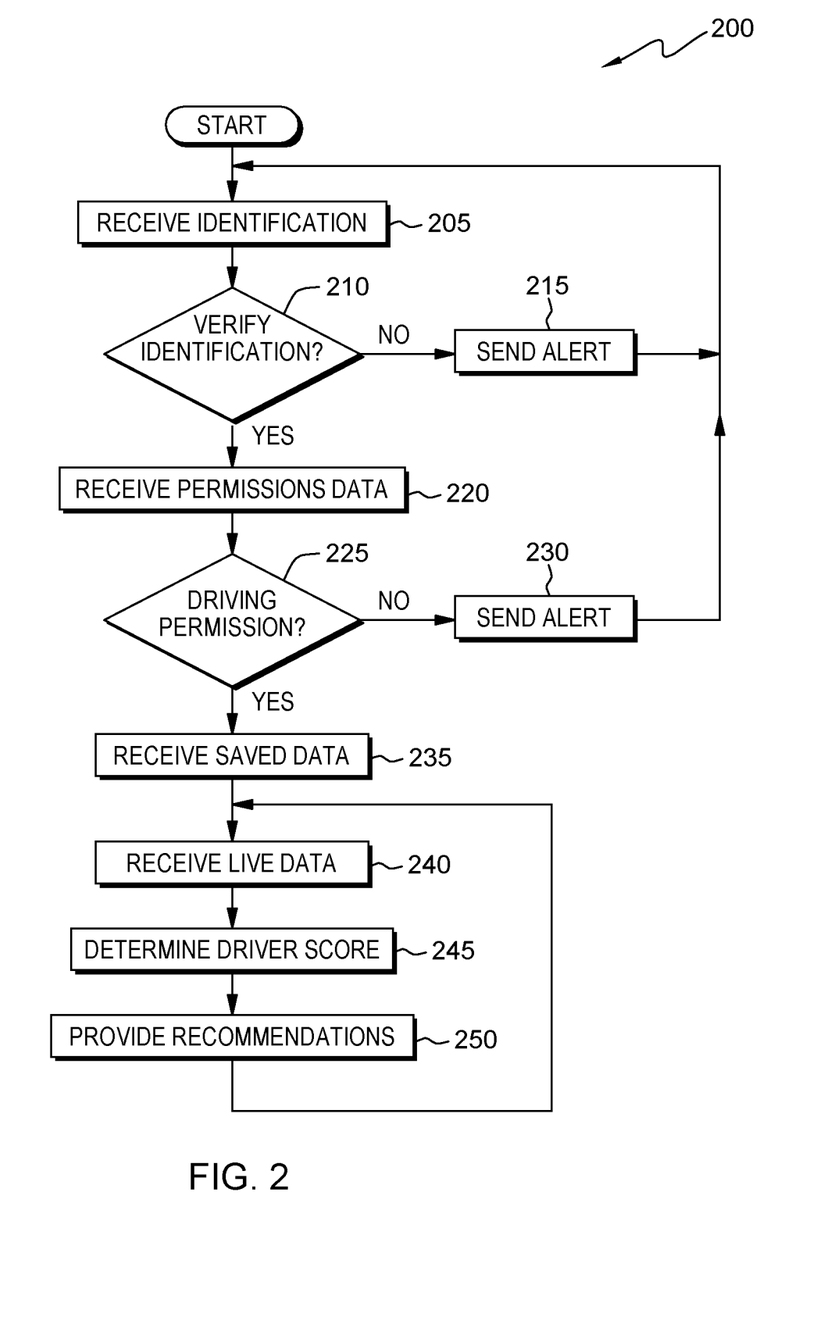
FIG. 2 depicts a flowchart of operational steps of a program for driver vehicle usage, in accordance with an embodiment of the present invention.

FIG. 2 is a flowchart of workflow 200 depicting operational steps for driver vehicle usage, in accordance with an embodiment of the present invention. In one embodiment, the steps of the workflow are performed by driver program 122. In an alternative embodiment, steps of the workflow can be performed by any other program while working with driver program 122. In an embodiment, a user can invoke workflow 200 upon a user wanting to drive a vehicle. In an alternative embodiment, a user can invoke workflow 200 upon a user wanting a recommendation.

Driver program 122 receives identification (step 205). In other words, driver program 122 receives identification information from ID device 130 about any number of users of the vehicle. In an embodiment, driver program 122 may receive identification information about the user that will be driving the vehicle. In an alternative embodiment, driver program 122 may receive identification information about any number of users that are in the vehicle but are not driving the vehicle. In an embodiment, a single ID device 130 (i.e. a finger print scanner) may be used to receive the identification information. In an alternative embodiment, more than one ID device 130 (i.e. a finger print scanner and a retinal scanner) may be used to receive the identification information. In a first example, Person A slides the license of Person A through a bar code scanner upon entering Vehicle A. Driver program 122 receives the identification information of Person A and driver program 122 knows that Person A is the operator of vehicle A. In a second example, Person X, Person Y, and Person Z enter Vehicle Z. Upon sitting in the side of Vehicle Z that operates Vehicle Z, Person X slides the license of Person X through a bar code scanner. Driver program 122 receives the identification information of Person X and driver program 122 knows Person X is the operator of vehicle Z. Person Y and Person Z use a fingerprint scanner upon entering the vehicle. Driver program 122 receives the identification information of Person Y and Person Z and driver program 122 knows Person Y and Person Z are passengers in the vehicle.

Driver program 122 verifies the identification (decision block 210). In other words, driver program 122 compares the identification information received in step 205 to identification information stored in information repository 124. In an embodiment, driver program 122 determines the identity of the any number of users of the vehicle based on the comparison.

If the identification is not verified (decision block 210, no branch), driver program 122 sends an alert (step 215). In other words, driver program 122 compares the identification information received in step 205 to the identification information stored in information repository 124 and if one or more of the any number of identities of the users is not verified (i.e. they are not allowed to be in the vehicle, etc.) then driver program 122 sends an alert. In an embodiment, driver program 122 may send the alert to the owner of the vehicle or to local law enforcement (i.e., a user or entity that manages the vehicle). In an embodiment, driver program 122 can send a text, video, or audio alert. In an alternative embodiment, driver program 122 can send the received identification information in the alert. In yet another alternative embodiment, driver program 122 can send in the alert live biometric data and/or live video/audio from the vehicle. In an embodiment, upon sending an alert to a user regarding the one or more of the any number of users that is not verified, driver program 122 may receive an indication that the one or more of the any number of users that was not verified is now verified based on input from a user. In the first example, driver program 122 compares the identification information of Person A to the identification information stored in information repository 124 and determines that Person A is verified to use Vehicle A. In the second example, driver program 122 compares the identification information of Person X, Person Y, and Person Z to the identification information stored in information repository 124. Driver program 122 determines that Person X and Person Y are verified to use Vehicle Z but Person Z is not verified to use Vehicle Z and driver program 122 notifies the owner of Vehicle Z that a non-verified user is in the vehicle.

If the identification is verified (decision block 210, yes branch), driver program 122 receives permissions data (step 220). In other words, driver program 122 receives permissions data for all users of the any number of users that have been verified. In an embodiment, driver program 122 may request the permissions data from a user (i.e. owner of the vehicle, etc.) or an agency (i.e., DMV, insurance agency, etc.). In an alternative embodiment, driver program 122 may receive the permissions data that is stored in information repository 124. In an embodiment, permission data may include one or more of the following data that is entered by a user that manages the vehicle (i.e., the owner of the vehicle): locations a user can drive the vehicle, speeds the user can drive the vehicle, times the user can drive the vehicle, other users that are allowed in the vehicle, equipment in the vehicle that the user may utilize while driving (i.e. a radio, a navigation system, etc.), wireless device usage permission, etc.). In an embodiment, permission data may include one or more of the following data that is received by an agency: current vehicle insurance status, driving permissions, valid or invalid licensing of the user, etc. In an embodiment, permissions data may include police arrests and warrants for an individual. In the first example, driver program 122 receives permissions data from information repository 124 that Person A is allowed to drive Vehicle A with no restrictions. In the second example, driver program 122 request permissions data from the owner of the vehicle and receives information that Person X can drive Vehicle Z anywhere but only up to 50 miles per hour if there are two or more people in the vehicle and driver program also receives permissions data from information repository 124 that Person X has a "limited" use license and cannot drive after a certain time of day due to the age of Person X.

Driver program 122 verifies the driving permission (decision block 225). In other words, driver program 122 compares the permissions data received in step 220 for the any number of users and determines if the any number of users are verified to drive the vehicle. In the first example, driver program 122 verifies that Person A may utilize Vehicle A in any manner. In the second example, driver program 122 verifies that Person X can use Vehicle Z up to 50 miles per hour because there are two or more people in the vehicle and that Person X cannot drive Vehicle Z between 8:00 PM and 6:00 AM.

If the driver does not have permission (decision block 225, no branch), driver program 122 sends an alert (step 230). In other words, driver program 122 compares the permissions data received in step 220 for the any number of users and determines if the any number of users are verified to drive the vehicle and if one or more of the users is not verified (i.e. they are not allowed to drive the vehicle) then driver program 122 sends an alert. In an embodiment, driver program 122 may send the alert to the owner of the vehicle or to local law enforcement. In an embodiment, driver program 122 can send a text, video, or audio alert. In an alternative embodiment, driver program 122 can send the received identification information in the alert. In yet another alternative embodiment, driver program 122 can send in the alert live biometric data and/or live video/audio from the vehicle. In an embodiment, upon sending an alert to a user regarding a user that is not verified, driver program 122 may receive an indication that the user that was not verified is now verified based on input from a user (i.e. a vehicle owner has not allowed their child to drive after 10:00 PM but they are driving home from the movies so the owner gives permission for the child to drive after 10:00 PM). In an embodiment, the users of the vehicle are notified, via a user interface in vehicle 110, of the permissions for each user. In the first example, driver program 122 compares the permissions data of Person A to the permissions data stored in information repository 124 and determines that Person A has permission to use Vehicle A so there is no alert. In the second example, driver program 122 compares the permissions data of Person X, Person Y, and Person Z to the permissions data in information repository 124. Driver program 122 determines that Person X, Person Y, and Person Z are have permission to use Vehicle Z but driver program 122 will send an alert to the police if the vehicle is used after 8:00 PM and driver program 122 will send an alert to the owner of the vehicle if the vehicle travels faster than 50 miles per hour.

If the driver has permission (decision block 225, yes branch), driver program 122 receives saved data (step 235). In other words, driver program 122 receives saved data stored in information repository 124 about the any number of users that was previously determined by driver program 122. In an embodiment, the saved data may include one or more of the following: driving habits, driving scores, location-based recommendations, driving route recommendations, biometric insights, etc. In an embodiment, the saved data may include any data stored in information repository 124.

Driver program 122 receives live data (step 240). In other words, driver program 122 receives live data about the vehicle and the any number of users. In an embodiment, the live data is stored to information repository 124. In an embodiment, the live data may include one or more of the following vehicle data: speed, location, acceleration, weather data near the vehicle, vehicle identification number, odometer reading, location of users in the vehicle, traffic near vehicle, driving route of vehicle, etc. In an embodiment, the live data may include one or more of the following user biometric data: temperature of the any number of users, heart rate of the any number of users, voice tone and volume of the any number of users, eyelid/eye movement of the driver regarding tiredness, etc. In the first example, live data is that Vehicle A is traveling 25 miles per hour with no acceleration in an area with no traffic and sunny weather and the user is experiencing comfortable temperature and stable blood pressure. In the second example, live data is that Vehicle Z is accelerating and deaccelerating often, a speed of 5 miles per hours and in an area with a lot of traffic, the weather is rainy, and the users are experiencing high blood pressure.

Driver program 122 determines a driver score (step 245). In other words, driver program 122 determines a score for the any number of users based on the received saved data and the received live data. In an embodiment, the driver score does not need to be calculated. In an embodiment, a brand new driver score can be calculated. In an alternative embodiment, a modified/updated driver score can be calculated based on a previously determined driver score. In an embodiment, a higher score is better than a lower score. In the first example, Person A has never had a driver score before and driver program 122 determines a driver score of 90 due to the environment that vehicle is performing in being a low risk/low stress due to good weather conditions and steady vehicle speed and Person A having a low blood pressure. In the second example, Person X, Person Y, and Person Z do not have a driver score calculated for them.

Driver program 122 provides recommendations (step 250). In other words, driver program 122 provides recommendations to the users in the vehicle, to the owner of the vehicle, to government agencies, and/or to companies based on the information received previously and/or the previously determined driver score. In an embodiment, the recommendation may be displayed on a user interface (not shown) within vehicle 110. In an embodiment, the recommendation may be transmitted to another computing device (not shown). In an embodiment, the recommendation may be a real time routing suggestions to one or more preferred or frequently visited locations, including but not limited to: fuel retailers, restaurants, rest/lodging areas, entertainment areas, shopping areas, etc. In an embodiment, the recommendation may be to send the driving score to an insurance agency to allow the insurance agency to customize insurance plans and offer insurance incentives/discounts for high driver scores and higher insurance premiums for lower driving scores. In an embodiment, the recommendation may be to send the driver score and previously determined information to companies, banks, dealerships of vehicles, and other parties for driver profiling and segmentation purposes to better target customer sets and identify potential consumer opportunities. In an embodiment, the recommendation may be to send the driver score and previously determined information to government agencies for identity resolution purposes based on driving patterns, driver profile data, route history, and destination history data. In an embodiment, driver program 122 may use various data modeling techniques to determine patterns and correlations in the saved data and live data to make the recommendation. In the first example, driver program 122 may provide the driver score to the insurance company of Person A and due to the high driver score Person A may receive a discounted insurance policy premium. In the second example, driver program may provide the driving conditions to a routing system to determine a safer lower stress route for Person X to drive Vehicle Z that does not have as much traffic and avoids potential delays due to weather.

Figure 3:
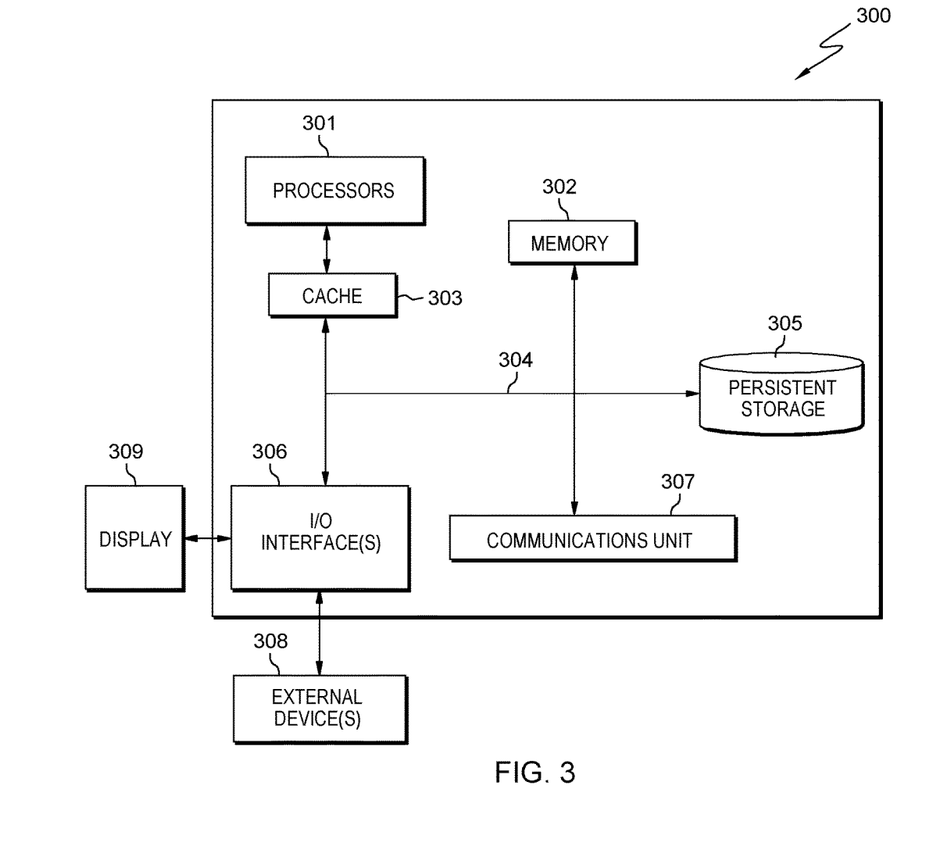
FIG. 3 depicts a block diagram of components of the computer of FIG. 1, in accordance with an embodiment of the present invention.

FIG. 3 depicts computer system 300, which is an example of a system that includes driver program 122. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method for controlling driver vehicle usage, the method comprising the steps of:
    determining, by one or more computer processors, identification information for each user of one or more users in a vehicle utilizing an identification device located within the vehicle, wherein determining the identification information further comprises:
        determining, by one or more computer processors, an identity of an operator of the vehicle by analyzing a driver's license, provided by the operator, utilizing the identification device;
    determining, by one or more computer processors, whether the identification information for each user of the one or more users is correct;
    receiving, by one or more computer processors, live vehicle data associated with the vehicle;
    receiving, by one or more computer processors, live user data associated with each user of the one or more users, wherein the live user date includes biometric information data associated with the one or more users in the vehicle; and
    in response to a user requesting a recommendation, determining, by one or more processors, a recommendation for the user, the recommendation including an alternate driving route that includes safer driving conditions, based on identification information of the one or more users in a vehicle, the received live vehicle data, and the received biometric information of the live user data.

2. The method of claim 1, further comprising:
    responsive to determining the identification information for all users of the one or more users is correct, requesting, by one or more computer processors, permissions data for each user of the one or more users;
    receiving, by one or more computer processors, the requested permissions data for each user of the one or more users;
    determining, by one or more computer processors, whether to grant permission to use the vehicle to each user of the one or more users based on the permissions data; and
    responsive to determining not to grant permission to use the vehicle to each user of the one or more users based on the permissions data, notifying, by one or more computer processors, a manager of the vehicle.

3. The method of claim 2, further comprising:
    responsive to determining to grant permission to use the vehicle to each user of the one or more users based on the permissions data, receiving, by one or more computer processors, saved data associated with each user of the one or more users.

4. The method of claim 3, further comprising:
    determining, by one or more computer processors, a driver score for a first user of the one or more users using the saved data associated with the first user, the live user data associated with the first user, and the live data associated with the vehicle, wherein the first user is operating the vehicle.

5. The method of claim 4, further comprising:
    providing, by one or more computer processors, a recommendation for the first user, wherein the recommendation is determines based on the driver score, the saved data associated with the first user, the live data associated with the first user, and the live data associated with the vehicle.

6. The method of claim 1, wherein the live user data can be selected from the group consisting of temperature of the any number of the one or more users, heart rate of the any number of the one or more users, voice tone and volume of the any number of the one or more users, and eyelid/eye movement of a first user.

7. The method of claim 1, wherein the live vehicle data can be selected from the group consisting of speed, location, acceleration, weather data near the vehicle, vehicle identification number, odometer reading, location of users in the vehicle, traffic near the vehicle, and driving route of the vehicle.

8. The method of claim 1, wherein the live user data includes voice tone and volume of the any number of the one or more users.

9. A computer program product for controlling driver vehicle usage, the computer program product comprising:
    one or more computer readable storage media; and
    program instructions stored on the one or more computer readable storage media, the program instructions comprising:
        program instructions to determine identification information for each user of one or more users in a vehicle utilizing an identification device located within the vehicle, wherein the program instructions to determine the identification information further comprise program instructions to:
  determine an identity of an operator of the vehicle by analyzing a driver's license, provided by the operator, utilizing the identification device;
program instructions to determine whether the identification information for each user of the one or more users is correct;
program instructions to receive live vehicle data associated with the vehicle;
program instructions to receive live user data associated with each user of the one or more users, wherein the live user date includes biometric information data associated with the one or more users in the vehicle; and
in response to a user requesting a recommendation, program instructions to determine a recommendation for the user, the recommendation including an alternate driving route that includes safer driving conditions, based on identification information of the one or more users in a vehicle, the received live vehicle data, and the received biometric information of the live user data.

10. The computer program product of claim 9, further comprising program instructions stored on the one or more computer readable storage media, the program instructions comprising:
  responsive to determining the identification information for all users of the one or more users is correct, request permissions data for each user of the one or more users;
  receive the requested permissions data for each user of the one or more users;
  determine whether to grant permission to use the vehicle to each user of the one or more users based on the permissions data; and
  responsive to determining not to grant permission to use the vehicle to each user of the one or more users based on the permissions data, notify a manager of the vehicle.

11. The computer program product of claim 10, further comprising program instructions stored on the one or more computer readable storage media, the program instructions comprising:
  responsive to determining to grant permission to use the vehicle to each user of the one or more users based on the permissions data, receive saved data associated with each user of the one or more users.

12. The computer program product of claim 11, further comprising program instructions stored on the one or more computer readable storage media, the program instructions comprising:
  determine a driver score for a first user of the one or more users using the saved data associated with the first user, the live user data associated with the first user, and the live data associated with the vehicle, wherein the first user is operating the vehicle.

13. The computer program product of claim 12, further comprising program instructions stored on the one or more computer readable storage media, the program instructions comprising:
  provide a recommendation for the first user, wherein the recommendation is determines based on the driver score, the saved data associated with the first user, the live data associated with the first user, and the live data associated with the vehicle.

14. The computer program product of claim 9, wherein the live user data can be selected from the group consisting of temperature of the any number of the one or more users, heart rate of the any number of the one or more users, voice tone and volume of the any number of the one or more users, and eyelid/eye movement of a first user.

15. The computer program product of claim 9, wherein the live vehicle data can be selected from the group consisting of speed, location, acceleration, weather data near the vehicle, vehicle identification number, odometer reading, location of users in the vehicle, traffic near the vehicle, and driving route of the vehicle.

16. A computer system for controlling driver vehicle usage, the computer system comprising:
  one or more computer processors;
  one or more computer readable storage media; and
  program instructions stored on the one or more computer readable storage media for execution by at least one of the one or more computer processors, the program instructions comprising:
    program instructions to determine identification information for each user of one or more users in a vehicle utilizing an identification device located within the vehicle, wherein the program instructions to determine the identification information further comprise program instructions to:
      determine an identity of an operator of the vehicle by analyzing a driver's license, provided by the operator, utilizing the identification device;
    program instructions to determine whether the identification information for each user of the one or more users is correct;
    program instructions to receive live vehicle data associated with the vehicle;
    program instructions to receive live user data associated with each user of the one or more users, wherein the live user date includes biometric information data associated with the one or more users in the vehicle; and
    in response to a user requesting a recommendation, program instructions to determine a recommendation for the user, the recommendation including an alternate driving route that includes safer driving conditions, based on identification information of the one or more users in a vehicle, the received live vehicle data, and the received biometric information of the live user data.

17. The computer system of claim 16, further comprising program instructions stored on the one or more computer readable storage media for execution by at least one of the one or more computer processors, the program instructions comprising:
  responsive to determining the identification information for all users of the one or more users is correct, request permissions data for each user of the one or more users;
  receive the requested permissions data for each user of the one or more users;
  determine whether to grant permission to use the vehicle to each user of the one or more users based on the permissions data; and
  responsive to determining not to grant permission to use the vehicle to each user of the one or more users based on the permissions data, notify a manager of the vehicle.

18. The computer system of claim 17, further comprising program instructions stored on the one or more computer readable storage media for execution by at least one of the one or more computer processors, the program instructions comprising:

responsive to determining to grant permission to use the vehicle to each user of the one or more users based on the permissions data, receive saved data associated with each user of the one or more users.

19. The computer system of claim 18, further comprising program instructions stored on the one or more computer readable storage media for execution by at least one of the one or more computer processors, the program instructions comprising:

determine a driver score for a first user of the one or more users using the saved data associated with the first user, the live user data associated with the first user, and the live data associated with the vehicle, wherein the first user is operating the vehicle.

20. The computer system of claim 16, wherein the live user data includes voice tone and volume of the any number of the one or more users.

* * * * *